United States Patent
Schneider

(10) Patent No.: US 9,815,429 B2
(45) Date of Patent: Nov. 14, 2017

(54) ADAPTIVE VENT FOR KNEE AIRBAG

(71) Applicant: Autoliv ASP, Inc., Ogden, UT (US)

(72) Inventor: David W. Schneider, Waterford, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 15/051,487

(22) Filed: Feb. 23, 2016

(65) Prior Publication Data

US 2017/0240132 A1   Aug. 24, 2017

(51) Int. Cl.
  *B60R 21/2338*   (2011.01)
  *B60R 21/206*   (2011.01)
  *B60R 21/239*   (2006.01)
  *B60R 21/231*   (2011.01)

(52) U.S. Cl.
  CPC ........ *B60R 21/2338* (2013.01); *B60R 21/206* (2013.01); *B60R 21/239* (2013.01); *B60R 2021/2395* (2013.01); *B60R 2021/23169* (2013.01); *B60R 2021/23386* (2013.01)

(58) Field of Classification Search
  CPC . B60R 21/206; B60R 21/2338; B60R 21/239; B60R 2021/23169; B60R 2021/23386; B60R 2021/2395
  See application file for complete search history.

(56) References Cited

U.S. PATENT DOCUMENTS

| | | | | |
|---|---|---|---|---|
| 3,879,057 | A | * 4/1975 | Kawashima | B60R 21/233 280/743.2 |
| 4,181,325 | A | * 1/1980 | Barnett | B60R 21/233 137/852 |
| 4,715,494 | A | * 12/1987 | Heitzenroder | B65D 81/2061 206/213.1 |
| 5,280,953 | A | 1/1994 | Wolanin et al. | |
| 5,405,166 | A | 4/1995 | Rogerson | |
| 5,556,128 | A | * 9/1996 | Sinnhuber | B60R 21/23138 280/730.2 |
| 5,839,755 | A | * 11/1998 | Turnbull | F16K 15/202 280/739 |
| 6,155,595 | A | * 12/2000 | Schultz | B60R 21/233 280/729 |
| 7,261,319 | B2 | 8/2007 | DePottey et al. | |

(Continued)

FOREIGN PATENT DOCUMENTS

EP    2718155 B1   8/2015

*Primary Examiner* — Barry Gooden, Jr.
(74) *Attorney, Agent, or Firm* — Stoel Rives LLP

(57) ABSTRACT

A knee airbag (KAB) can be constructed with an adaptive vent for reducing internal cushion pressure when the deployment path is obstructed. Obstruction may occur, for instance, by an out-of-position occupant, or when the occupant's legs are in close proximity to the deploying KAB. By reducing the cushion pressure through adaptive venting, a potential for injury due to the deploying KAB can be reduced. External straps can be used to close the vents when no obstruction is encountered. With an adaptive KAB vent design, a direct contact between the occupant and the KAB adaptive vent straps can determine an amount of venting. In addition, the straps may be designed so that they are adaptive (tapered, positioned on an angle, or using different spacing) to account for different occupant sizes/knee spacing/knee contact locations.

7 Claims, 15 Drawing Sheets

(56) References Cited

U.S. PATENT DOCUMENTS

| | | | |
|---|---|---|---|
| 7,475,904 B2* | 1/2009 | Hofmann | B60R 21/23138 280/730.2 |
| 7,658,407 B2 | 2/2010 | Ford et al. | |
| 7,722,079 B2 | 5/2010 | Lee et al. | |
| 7,722,080 B2 | 5/2010 | Rose et al. | |
| 7,793,978 B2* | 9/2010 | Vigeant | B60R 21/233 280/732 |
| 7,850,200 B2* | 12/2010 | Zauritz | B60R 21/239 280/730.2 |
| 7,980,593 B2 | 7/2011 | Kim | |
| 7,988,188 B2* | 8/2011 | Zauritz | B60R 21/207 280/730.2 |
| 8,020,889 B2* | 9/2011 | Bauer | B60R 21/233 280/739 |
| 8,152,199 B2* | 4/2012 | Bauer | B60R 21/233 280/739 |
| 8,215,668 B2* | 7/2012 | Cho | B60R 21/2171 280/736 |
| 8,262,130 B2* | 9/2012 | Fischer | B60R 21/233 280/739 |
| 8,590,928 B2* | 11/2013 | Spahn | B60R 21/23 280/729 |
| 9,016,721 B1* | 4/2015 | Potter | B60R 21/239 280/739 |
| 9,061,646 B2* | 6/2015 | Abele | B60R 21/239 |
| 2001/0035639 A1* | 11/2001 | Amamori | B60R 21/233 280/740 |
| 2003/0015861 A1* | 1/2003 | Abe | B60R 21/231 280/730.1 |
| 2005/0184493 A1* | 8/2005 | Hofmann | B60R 21/23138 280/730.2 |
| 2007/0057492 A1* | 3/2007 | Feller | B60R 21/239 280/730.2 |
| 2007/0273133 A1* | 11/2007 | Zauritz | B60R 21/239 280/742 |
| 2009/0014989 A1* | 1/2009 | Henderson | B60R 21/232 280/730.2 |
| 2009/0189376 A1* | 7/2009 | Vigeant | B60R 21/233 280/742 |
| 2009/0189377 A1* | 7/2009 | Vigeant | B60R 21/233 280/743.2 |
| 2010/0096841 A1* | 4/2010 | Tanaka | B60R 21/2032 280/730.1 |
| 2010/0109303 A1* | 5/2010 | Abe | B60R 21/239 280/739 |
| 2011/0062692 A1* | 3/2011 | Yamane | B60R 21/23138 280/739 |
| 2013/0020787 A1* | 1/2013 | Abele | B60R 21/2338 280/729 |
| 2013/0020788 A1* | 1/2013 | Spahn | B60R 21/23 280/730.1 |
| 2014/0125039 A1* | 5/2014 | Abele | B60R 21/239 280/730.1 |
| 2015/0123385 A1* | 5/2015 | Abele | B60R 21/231 280/730.1 |
| 2015/0183391 A1* | 7/2015 | Abele | B60R 21/231 280/730.1 |
| 2016/0001734 A1* | 1/2016 | Sommer | B60R 21/233 280/729 |

* cited by examiner

ADAPTIVE VENT FOR KNEE AIRBAG

TECHNICAL FIELD

The present disclosure relates generally to the field of protection systems for vehicle occupants. More particularly, the present disclosure relates to airbag assemblies for a knee restraint that deploys toward knees of an occupant as a result of inflation of an airbag cushion.

BACKGROUND

Protection systems have been installed in vehicles to protect an occupant during a collision event. Some protection systems suffer from one or more drawbacks or may perform less than optimally in one or more respects. Certain embodiments disclosed herein can address one or more of these issues.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Figure 1A:
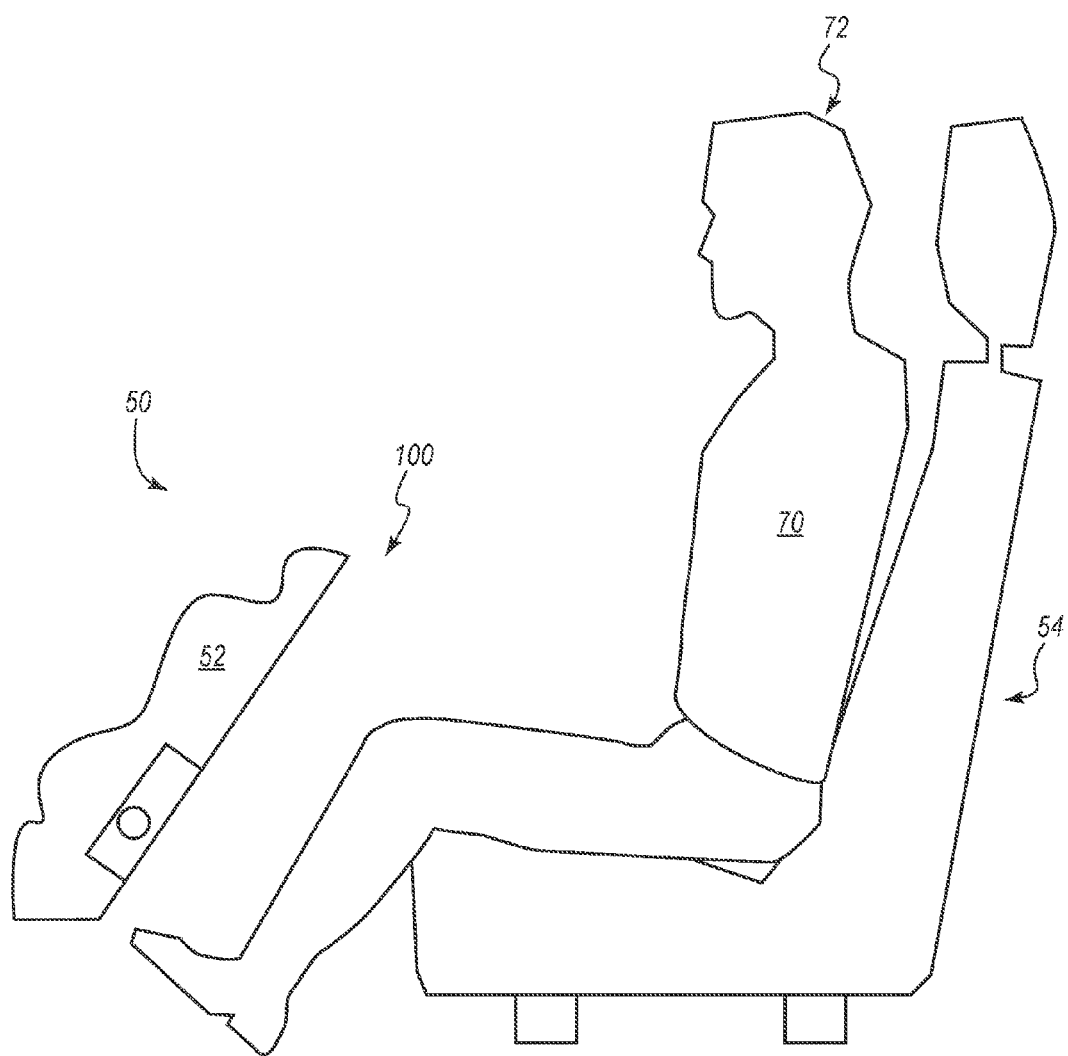
FIG. 1A is a side elevation view of an airbag assembly in a packaged state within a vehicle according to one embodiment of the present disclosure.

Occupant protection systems, such as airbag assemblies, may be installed at various locations within a vehicle to reduce or minimize occupant injury during a collision event. In the following disclosure, specific reference is made to airbag assemblies that are designed to deploy in the direction of a knee area of an occupant position, although the principles discussed herein may apply to airbag assemblies that are designed to cushion other occupants as well, such as occupants seated in a back seat of a vehicle. For example, an airbag assembly can deploy from the back of a seat (i.e., a seat back) to cushion a knee area of a back-seat occupant position of a vehicle.

Airbag assemblies generally include an airbag cushion. The airbag cushion is typically disposed within a housing in a packaged state (e.g., rolled, folded, and/or otherwise compressed) and may be retained in the packaged state behind a cover. During a collision event, an inflator may be triggered, which rapidly fills the airbag cushion with inflation gas. The inflation gas may cause the airbag cushion to rapidly transition from a compact packaged (i.e., un-deployed) state to an expanded or deployed state. In some embodiments, the expanding airbag cushion opens an airbag cover (e.g., by tearing through a tear seam or opening a door-like structure) to exit the housing. The inflator may be triggered by any suitable device or system, and the triggering may be in response to and/or influenced by one or more vehicle sensors.

Airbag assemblies can include a knee restraint or knee airbag ("KAB") to protect the knees and/or lower legs of an occupant during a collision event. Such knee restraints may absorb at least some of the impact energy of an occupant during a collision event. In some embodiments, the knee restraint may comprise an airbag cushion that contacts and cushions the knees of an occupant during a collision event.

Some KABs do not contain external vent holes, in order to efficiently utilize the inflation gas to quickly position and pressurize the cushion for early occupant restraint. Other KABs use one or more small discrete vent holes to provide gas venting to reduce cushion pressure during loading to limit forces on the femurs and for effective occupant "ride down." However, these KABs might not provide enough (or early enough) gas venting to prevent potential injury for "close proximity" or OOP occupants.

Some KABs do not have large side panels and do not deploy as deep as Driver-Side Airbags (DABs) or Passenger- Side Airbags (PABs). The sizes of panels can present a challenge for locating passive vents and having an effective closing strap. Some adaptive vents are located on side panels and can use an internal strap to close the vent (or a strap that is at least partially internal to the cushion).

A KAB can be constructed with an adaptive vent for reducing internal cushion pressure when the deployment path is obstructed. Obstruction may occur, for instance, by an OOP occupant, or when the occupant's legs are in close proximity to the deploying KAB (such as a shorter occupant in a forward seat position). By reducing the cushion pressure through adaptive venting, the potential for injury due to the deploying KAB can be reduced.

In some of the embodiments described herein, external straps are used to close the vents when no obstruction is encountered. In addition, the straps may be designed so that they are adaptive (tapered, positioned on an angle, or with different spacing) to account for different occupant sizes/knee spacing/knee contact locations. With an adaptive KAB vent design, a direct contact between the occupant and the KAB adaptive vent straps can determine an amount of venting. In addition, for normal unobstructed deployment, a contact between the occupant and vent straps is used to maintain tension in the straps to minimize leakage out of the vents.

Some embodiments of airbag assemblies disclosed herein may be useful for protecting occupants seated in a front seat of a vehicle. Other embodiments of the airbag assemblies disclosed herein may be particularly useful for protecting occupants who are seated rearward of the front seats of a vehicle.

For example, in some embodiments, the airbag assemblies include an airbag cushion that is deployed from a position immediately in front of the occupant at a relatively low position. For instance, the airbag cushion may deploy from an instrument panel or a seat back at a position that is level with or lower than the position of the knees of an occupant who is seated in a back seat.

The components of the embodiments as generally described and illustrated in the figures herein can be arranged and designed in a wide variety of configurations. Thus, the following more detailed description of various embodiments, as represented in the figures, is not intended to limit the scope of the present disclosure, but is merely representative of various embodiments. While various aspects of the embodiments are presented in drawings, the drawings are not necessarily drawn to scale unless specifically indicated.

The "venting capacity" of an airbag cushion or an airbag assembly may refer to the degree to which the airbag assembly allows inflation gas to vent from or exit the airbag assembly. For example, when one or more vents of an airbag cushion or airbag assembly are configured to allow a substantial volume of inflation gas to exit or vent from the airbag assembly in a largely unobstructed fashion, the airbag assembly may include a relatively large venting capacity. Conversely, one or more vents of the airbag assembly may more fully obstruct inflation gas from exiting the airbag assembly and the airbag assembly may then have a relatively low venting capacity. Stated differently, one or more vents or apertures of an airbag assembly may be obstructed to a lesser degree when the airbag assembly has a relatively high venting capacity, while one or more vents or apertures may be obstructed to a greater degree when the airbag assembly has a relatively low venting capacity. The venting capacity of an airbag or airbag assembly may correspond with an air pressure (e.g., a pressure of inflation gas) within an interior of an airbag or airbag assembly (e.g., within an inflatable chamber defined by the airbag).

A venting capacity (e.g., an optimal venting capacity) of an airbag assembly may correspond to an air pressure (e.g., an optimal air pressure) within an airbag cushion of the airbag assembly during a collision event. For example, it may be advantageous for an airbag cushion to have a relatively low venting capacity in response to some collision conditions and a relatively high venting capacity in response to other collision conditions. More specifically, airbags that only partially inflate, or are configured with a relatively high venting capacity, during initial stages of a collision event may provide better protection from and/or reduce the incidence of injury to an occupant in an OOP condition (an OOP occupant) or other situations in which a low-risk deployment ("LRD") may be desirable. Examples of OOP conditions and other LRD situations include collision events where a child, a baby in a rear-facing car seat, or an adult positioned too close to the airbag cushion interacts with the airbag cushion during inflation and expansion of deployment of the airbag assembly. Other collision conditions may also make LRD desirable.

The terms "connected to," "coupled to," and "in communication with" are used in their ordinary sense, and are broad enough to refer to any suitable coupling or other form of interaction between two or more entities, including mechanical and fluid interaction. Two components may be coupled to each other even though they are not in direct contact with each other. The phrase "attached to" refers to interaction between two or more entities that are in direct contact with each other and/or are separated from each other only by a fastener of any suitable variety (e.g., mounting hardware or an adhesive). The phrase "fluid communication" is used in its ordinary sense, and is broad enough to refer to arrangements in which a fluid (e.g., a gas or a liquid) can flow from one element to another element when the elements are in fluid communication with each other.

As used herein, the terms "forward" and "rearward" are used with reference to the front and back of the relevant vehicle. For example, an airbag cushion that deploys in a rearward direction deploys toward the back of a vehicle. Similarly, for an airbag cushion that deploys in front of an occupant, a rear surface of the airbag receives the occupant in a frontal collision event.

The directional terms "proximal" and "distal" are used herein to refer to opposite locations on an airbag cushion. The proximal end of an airbag cushion is the end of the airbag cushion that is closest to the inflator when the airbag cushion is fully inflated. The distal end of an airbag cushion is the end opposite the proximal end of the airbag cushion. In other words, the terms "proximal" and "distal" are with reference to a point of attachment, such as a point of attachment of the airbag cushion at an airbag assembly housing and a point of attachment of an airbag assembly at a seat back from which an airbag deploys. Specifically, "proximal" is situated toward such point of attachment and "distal" is situated away from such point of attachment.

The term "back seat," as used herein, refers to any seat that is disposed rearward of the front seat(s) of a vehicle, regardless of whether the seat is the most rearward seat in the vehicle. The term "back seat" also refers to any seat that is disposed rearward of other back seats.

Figure 1B:
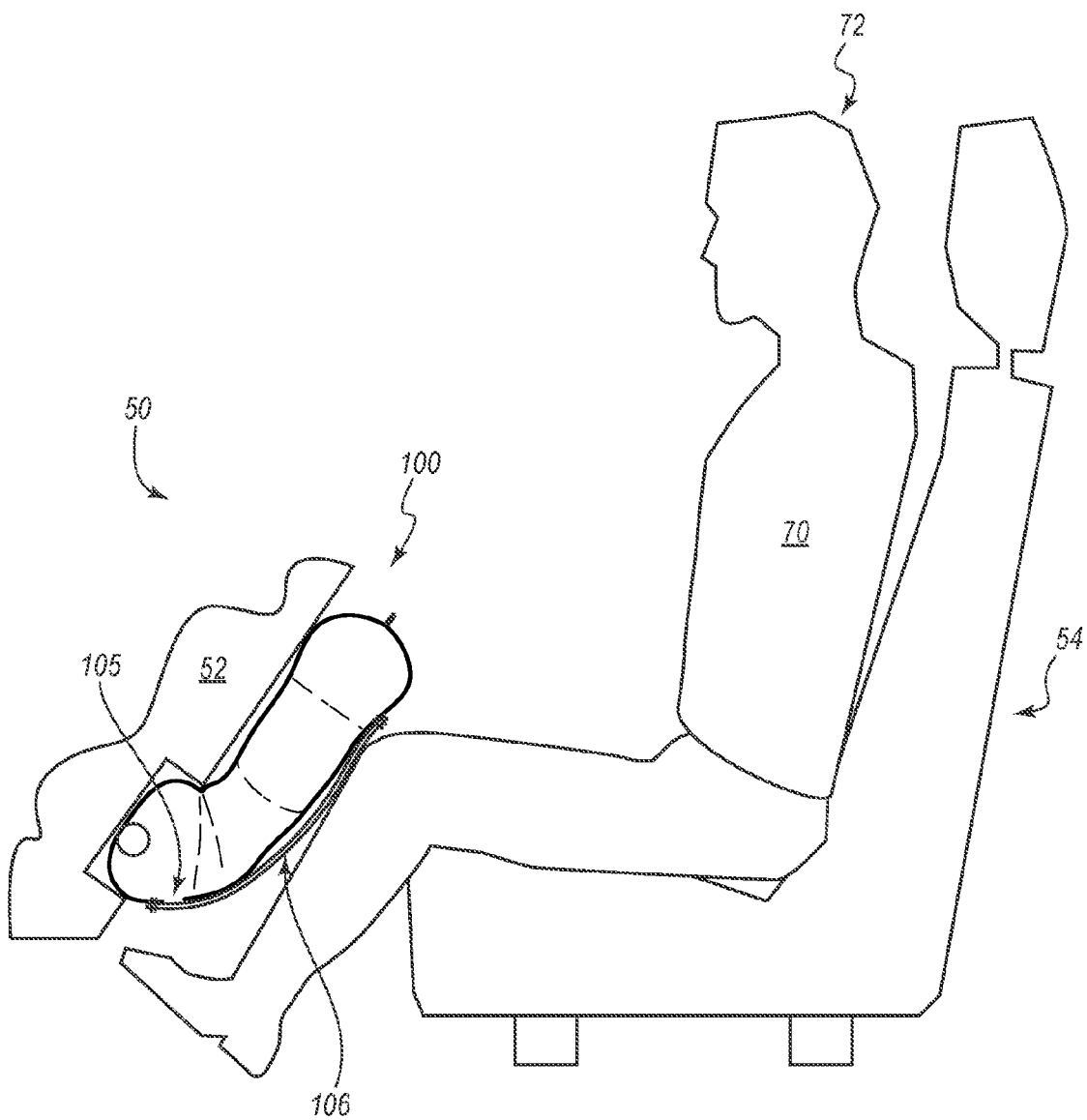
FIG. 1B is a side elevation view of the airbag assembly of FIG. 1A in a deployed state within a vehicle with an in-position occupant.
Figure 1C:
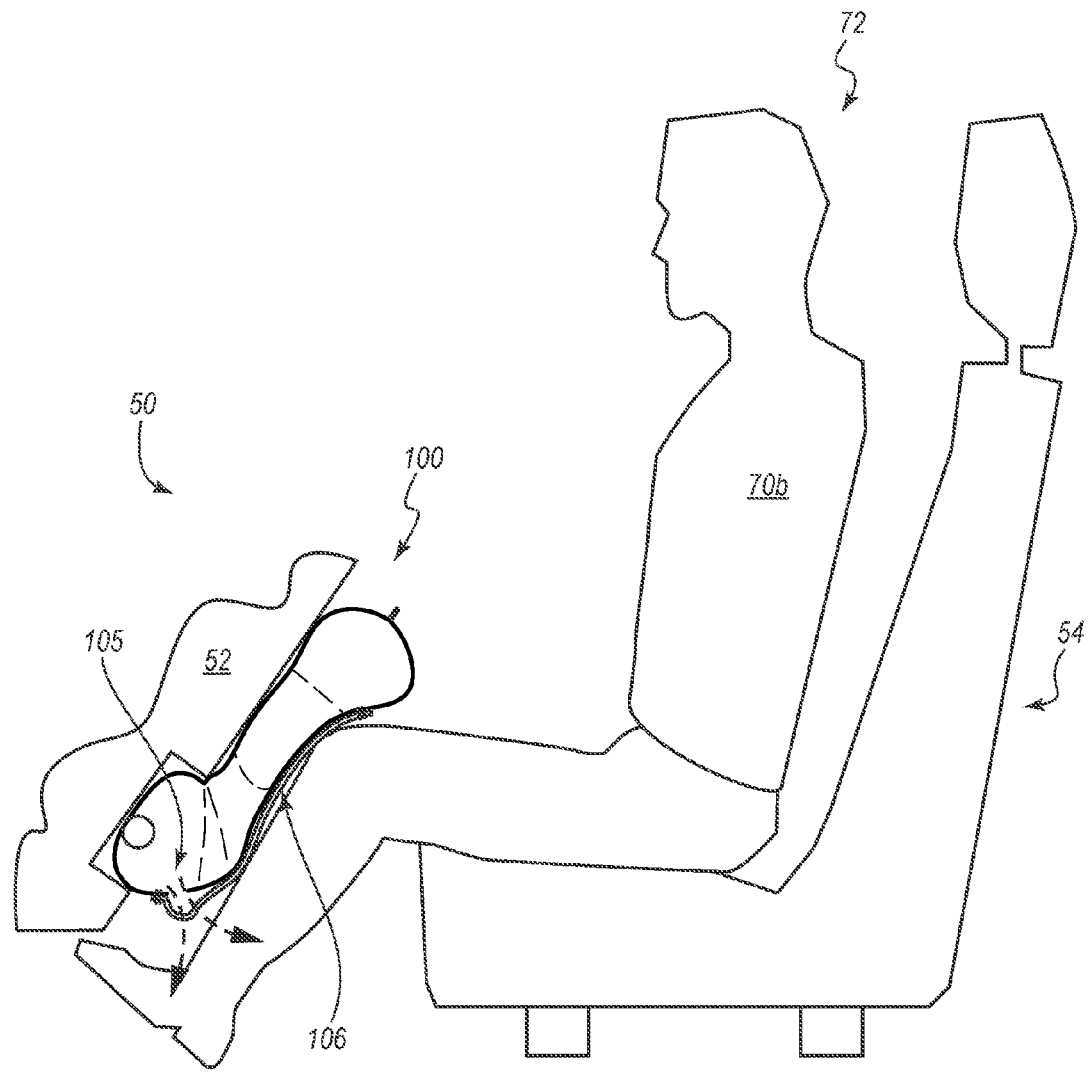
FIG. 1C is a side elevation view of the airbag assembly of FIG. 1A in a deployed state within a vehicle with an occupant in an out-of-position ("OOP") condition.

FIGS. 1A, 1B, and 1C show an airbag assembly 100 placed in an instrument panel 52 and a relation of the airbag assembly 100 to an occupant position 70. FIG. 1A is a side elevation view of an airbag assembly 100 in a packaged state within a vehicle 50, according to one embodiment of the present disclosure. FIG. 1B is a side elevation view of the airbag assembly 100 of FIG. 1A in a deployed state within a vehicle 50, according to one embodiment of the present disclosure. FIG. 1C is a side elevation view of the airbag assembly 100 of FIG. 1A in a deployed state within a vehicle with an occupant in and OOP condition 70b, which is forward of the occupant position 70. Although the airbag assembly 100 is shown mounted or otherwise disposed in the instrument panel 52, the airbag assembly could also be disposed in a seat back of a front seat (forward of a back seat to deploy to receive a rear occupant). Stated otherwise, the airbag assembly may be position at one of a bottom portion of an instrument panel and a bottom portion of a seat back.

An occupant position 70 may be defined by the seat 54 (e.g., a front passenger seat) and may be a position in which the vehicle 50 and/or the seat 54 is designed to transport an occupant 72 and may be a position in which the occupant 72 may be seated prior to and/or during a collision event. The airbag assembly 100 may include a cushion with a plurality of panels configured to define an inflatable chamber. During a collision event, an inflator may be triggered, which rapidly fills the inflatable chamber with inflation gas, causing the airbag assembly 100 to deploy. During deployment of the airbag assembly 100, the airbag cushion may expand in a rearward direction or toward the occupant position 70.

In FIG. 1A, an occupant 72 is disposed in an occupant position 70 of the vehicle 50 (shown partially by instrument panel 52 and seat 54). An airbag assembly 100 (of the KAB type), is disposed un-deployed proximate to a knee area of the occupant position 70.

In FIG. 1B, upon detection of an external event, such as a collision, the airbag assembly 100 is deployed by inflation from the instrument panel 52. The airbag assembly 100 includes an adaptive vent 105 disposed in a rear surface of the airbag assembly 100 that faces toward or is nearest the occupant position 70. The adaptive vent 105 is open or closed according to tension on a vent strap 106 that extends on an external surface of the air bag assembly 100 along a length of the of the airbag assembly 100. The length of the airbag may be orthogonal or otherwise transverse to a width of the airbag. The vent strap 106 may at a first end be secured to a lower portion (e.g., nearer a floor of the vehicle) of the airbag assembly 100 below the adaptive vent 105 and extend upward along a length of the airbag assembly 100. A second end of the vent strap 106 may be secured to an upper portion (e.g., nearer a roof of the vehicle) above the adaptive vent 105. Accordingly, the vent strap 106 is oriented in a generally upright orientation to extend generally up and down with respect to the vehicle. Friction between a knee/leg of an occupant disposed in the occupant position 70 and a vent strap 106 can maintain tension in the vent strap 106 and can prevent slack and reopening of an adaptive vent 105 of the airbag assembly 100. Contact by an occupant on the rear surface of the airbag assembly 100 results in tension on the vent strap 106 that maintains in a closed state the adaptive vent 105 that is disposed in the same rear surface being contacted by the occupant.

For example, in one embodiment and in an unobstructed deployment the vent straps 106 are put in tension, thereby closing off the adaptive vent 105. Due to friction between an occupant's knees/legs and the strap 106 during loading and ride down, the strap 106 covers or otherwise obstructs the vent aperture to prevent or minimize gas leakage. Strap material can be fabric (coated or uncoated) or other material which is flexible, to allow for folding within the airbag module and to provide a seal over or otherwise obstruct the adaptive vent 105 when the strap 106 is placed in tension.

Stated otherwise, the obstruction of the adaptive vent 105 by the strap 106 configures the airbag assembly 100 to have a lower-rate venting capacity. Expansion of the airbag cushion of the airbag assembly 100 may draw taut the strap 106 or otherwise reduce slack on the strap 106 that in turn transitions the adaptive vent 105 to a restraint venting state and/or to a closed state. In the closed state, the venting capacity of the adaptive vent 105 may be low (e.g., at or near zero), because the adaptive vent 105 is sealed or otherwise obstructed by the strap 106. When the adaptive vent 105 is in the closed state restraint, the venting capacity may be limited to a restraint venting rate that is appropriate for occupant ride down.

In FIG. 1C, and upon detection of an external event, such as a collision, the airbag assembly 100 is deployed by inflation from the instrument panel 52. When obstructed deployment of the airbag assembly 100 occurs, such as may be caused by interaction with an occupant in an OOP condition, slack remains in the vent strap 106 which allows gas to escape through the adaptive vent 105.

For example, in one embodiment and in an obstructed deployment the vent straps 106 are slack, thereby uncovering an opening or aperture for the adaptive vent 105 to provide a fluid exit for inflation gas. This opening allows the airbag cushion to operate at a lower pressure while having a lower volume (i.e., a restricted volume) while using the same inflator. Without adaptive vents, a smaller volume can cause a higher cushion pressure in the deployed airbag assembly 100. A higher cushion pressure can potentially harm an OOP occupant.

Stated otherwise, the exposed opening or aperture of the adaptive vent 105 configures the airbag cushion of the airbag assembly 100 to have a higher-rate venting capacity. Contact with an OOP occupant as the airbag cushion expands causes the vent strap 106 to remain in a slack state and to maintain an aperture of the adaptive vent 105 in an OOP-venting state and/or an open state. The open state may be at least a partially open or otherwise unobstructed state. In the open state, the venting capacity of the adaptive vent 105 may be high, appropriate for averting injury to an OOP occupant.

Figure 2:
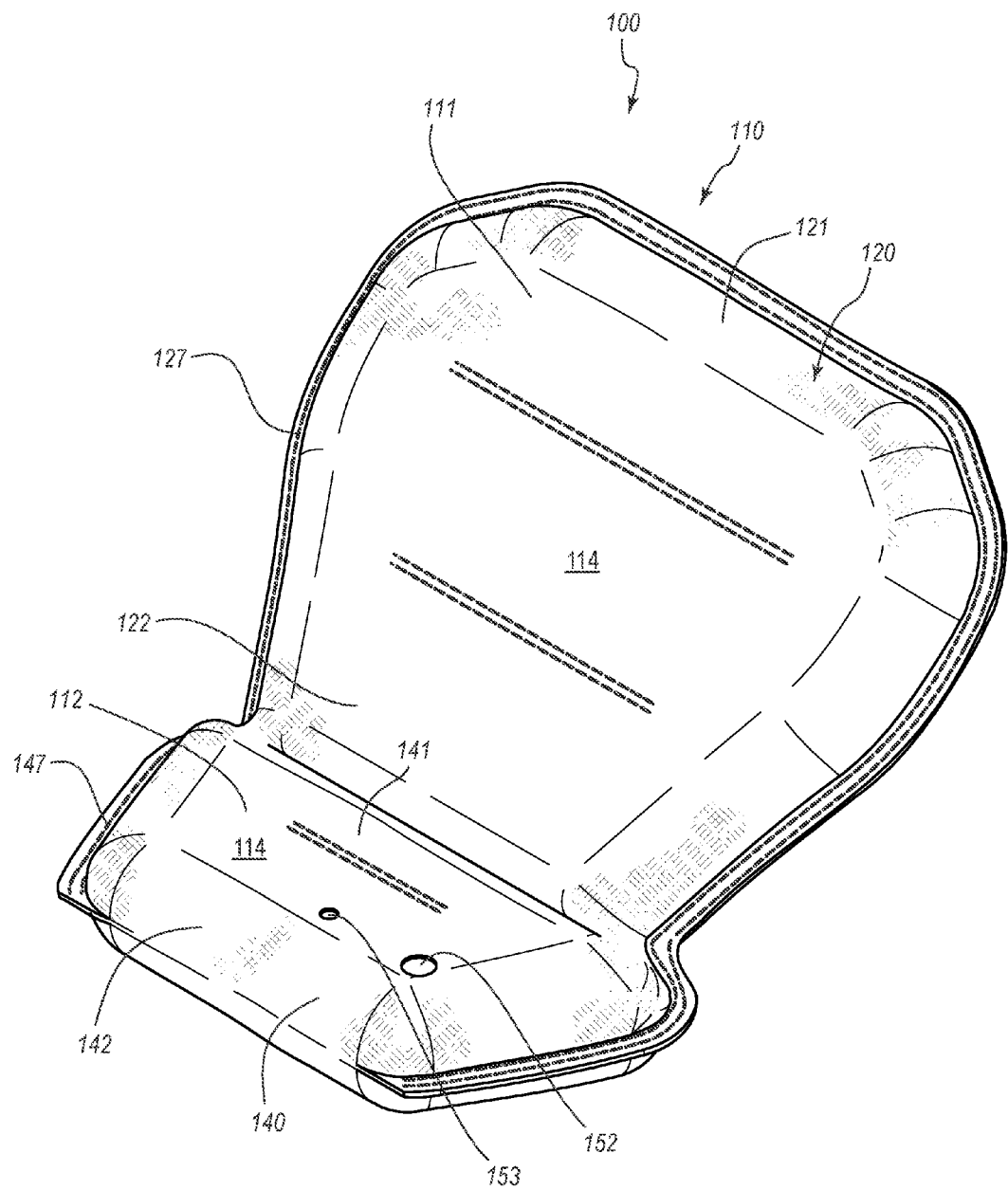
FIG. 2 is a front perspective view of an inflatable knee airbag according to one embodiment of the present disclosure.

FIG. 2 is a front perspective view of an inflatable knee airbag 110 having two or more chambers in a serial configuration. Inflatable knee airbag 110 may comprise a portion of an airbag assembly 100. Inflatable knee airbag 110 may comprise a first chamber 120 and a second chamber 140. In FIG. 2, the first and second chambers comprise independent inflatable chambers that are attached together and are in fluid communication.

Inflatable knee airbag 110 may be described as having an upper portion 111, a lower portion 112, a rear face (not shown), and a front face 114. Upper portion 111 of the inflatable knee airbag 110 is the portion that is closest to the headliner of a vehicle when the inflatable knee airbag 110 is in a deployed state. Lower portion 112 is below upper portion 111 when inflatable knee airbag 110 is in a deployed state, and is closest to a floor of the vehicle. The term "lower portion" is not necessarily limited to the portion of cushion that is below a horizontal medial plane of the cushion, but may include less than half, more than half or exactly half of the bottom portion of the cushion. Likewise, the term "upper portion" is not necessarily limited to the portion of cushion that is above a horizontal medial plane of the cushion, but may include less than half, more than half or exactly half of the top portion of the cushion.

First chamber 120 has an upper portion 121 and a lower portion 122, and is partially defined by a perimeter seam 127. Likewise, second chamber 140 has an upper portion 141, a lower portion 142, and a perimeter seam 147. Further, second chamber 140 comprises apertures for coupling an inflator to airbag 110; an inflator insert aperture 152 is configured to allow a tubular inflator to be inserted into second chamber 140 of cushion and an inflator stem aperture 153 is configured to allow a mounting stem of an inflator to protrude through the aperture.

Figure 3:
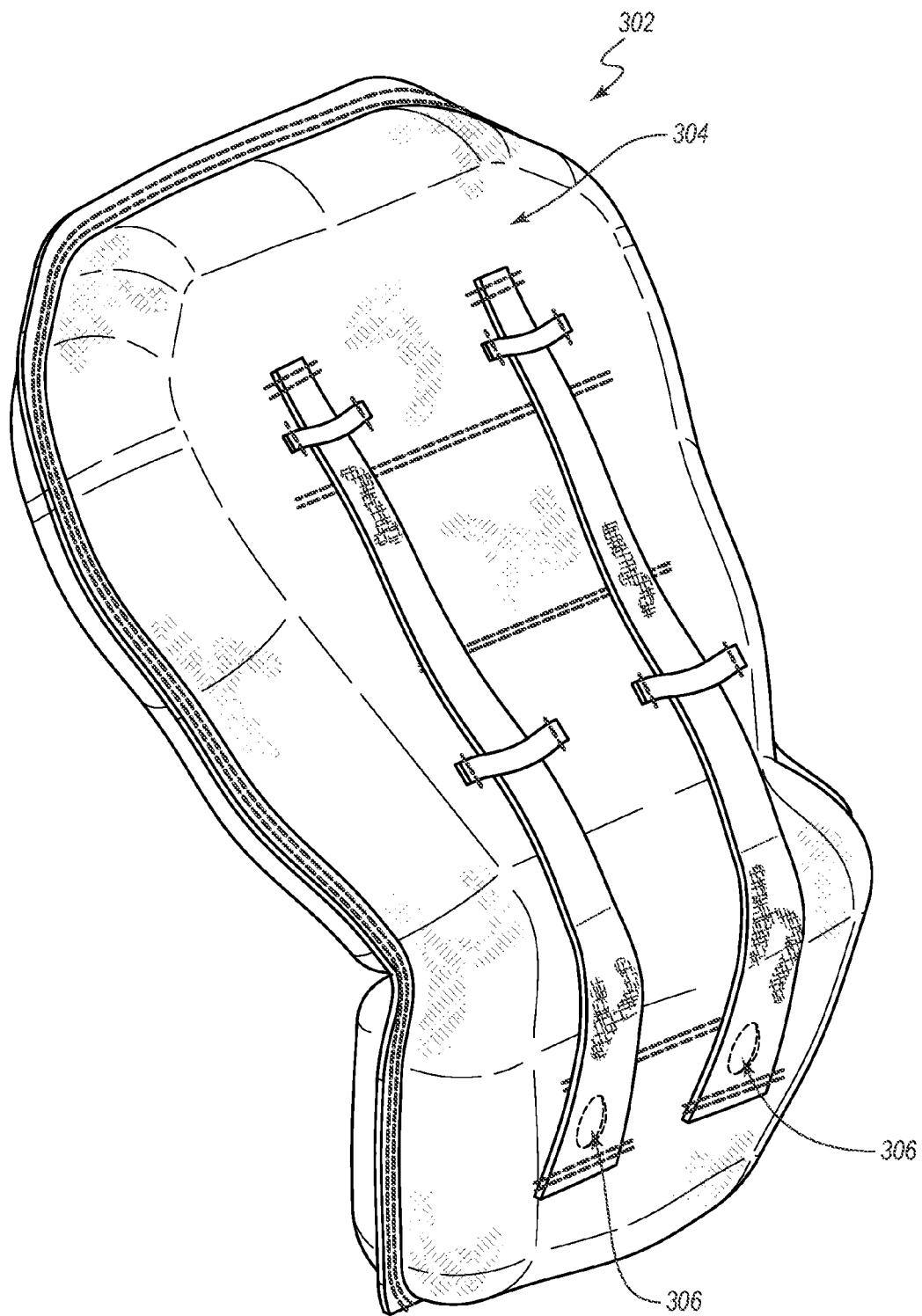
FIG. 3 is a rear perspective view of an inflatable knee airbag with multi-strap adaptive vents in a deployed state, according to one embodiment of the present disclosure.
Figure 4:
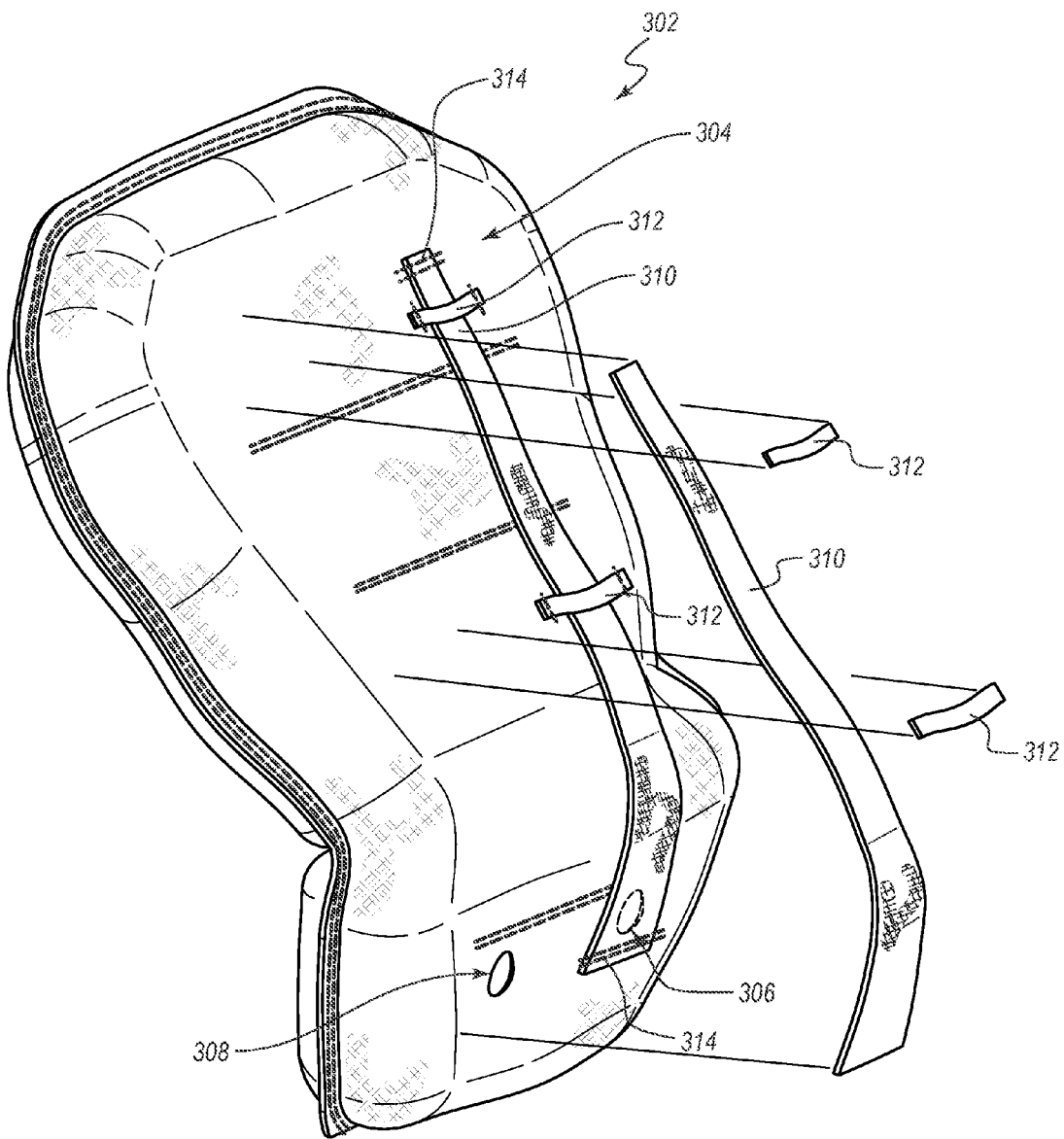
FIG. 4 is an exploded rear perspective view of the inflatable knee airbag with adaptive vents of FIG. 3 according to one embodiment of the present disclosure.
Figure 5:
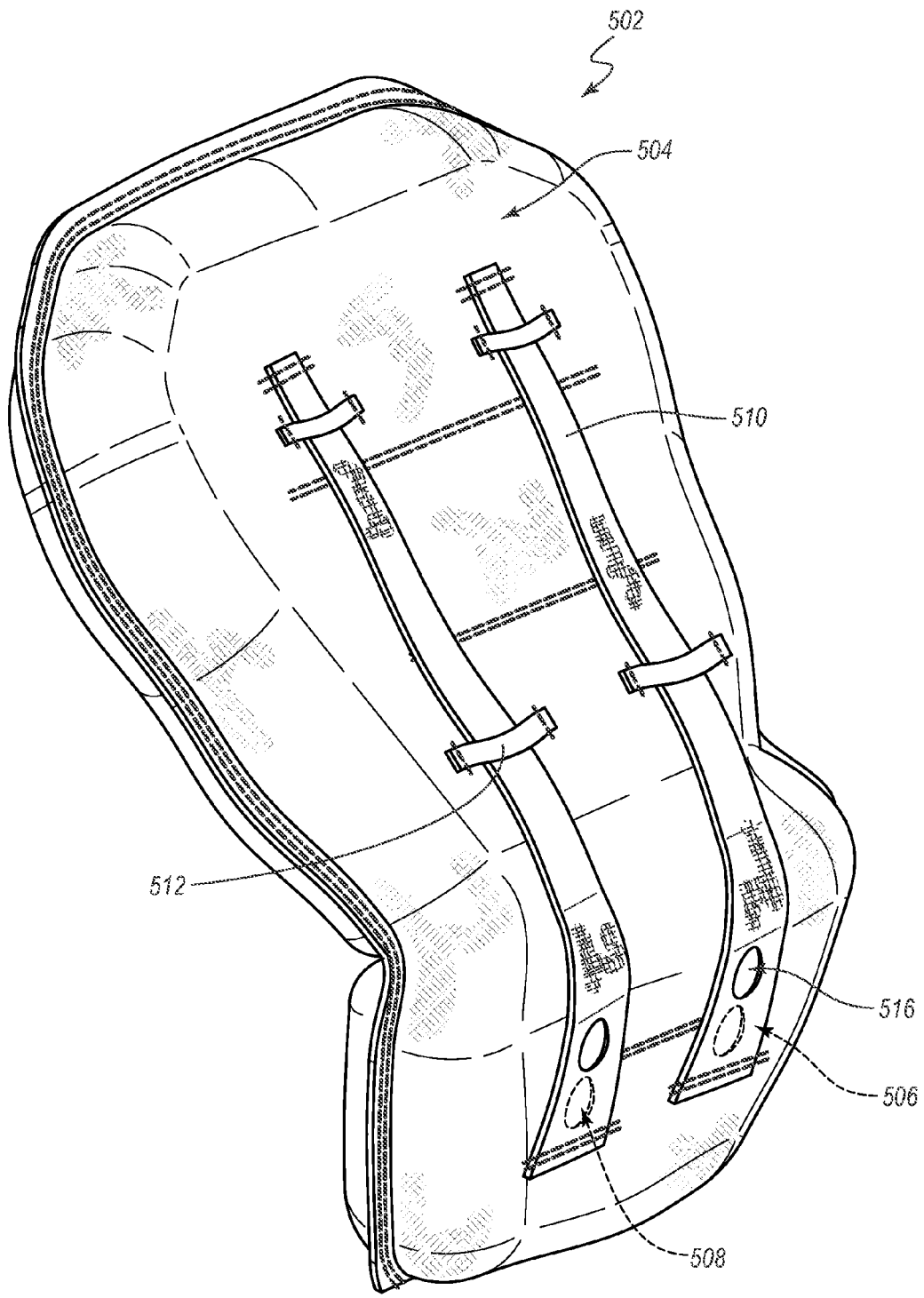
FIG. 5 is a rear perspective view of an inflatable knee airbag with adaptive vents and strap venting holes in a deployed state, according to one embodiment of the present disclosure.
Figure 6:
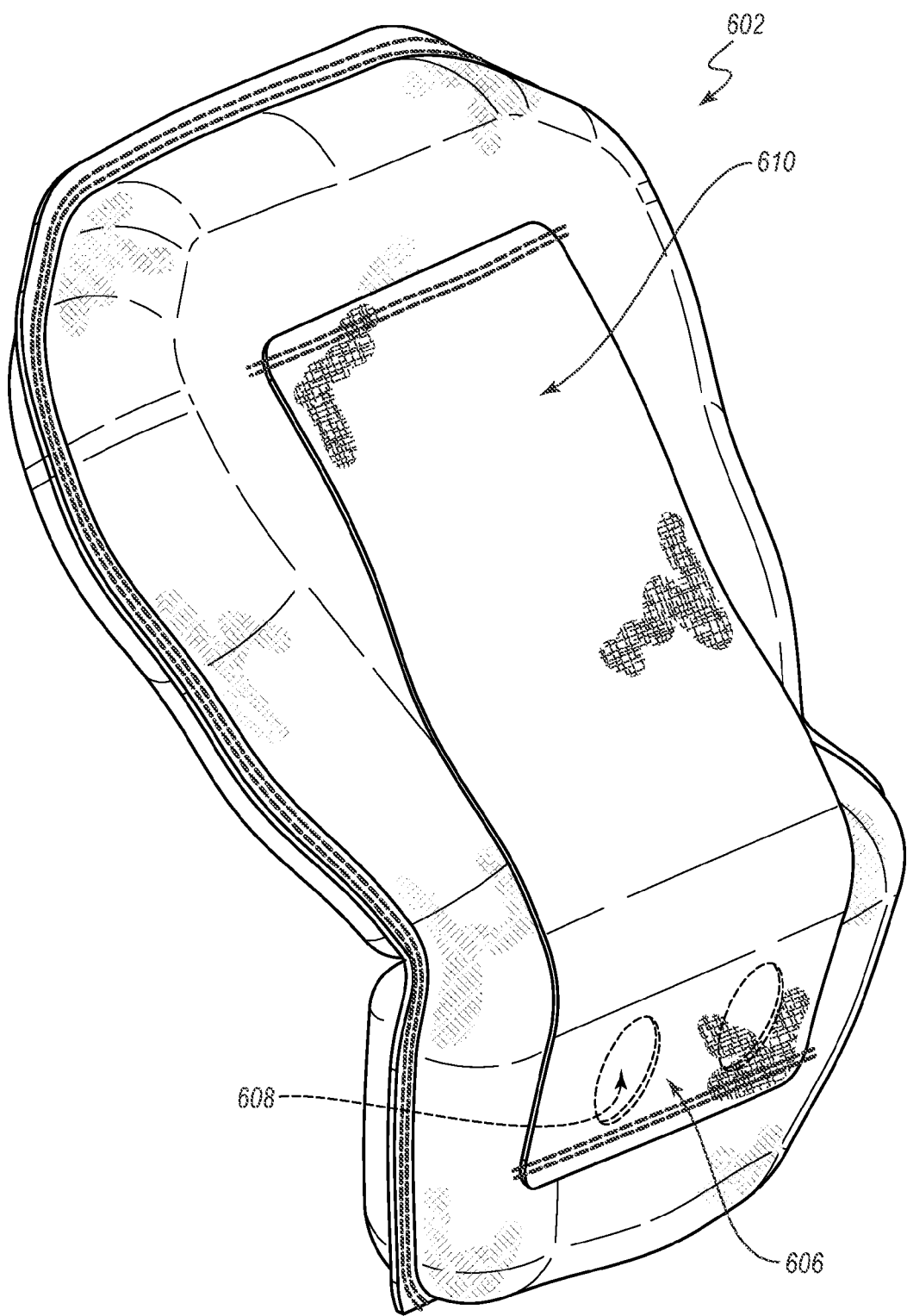
FIG. 6 is a rear perspective view of an inflatable knee airbag with adaptive vents with a wide strap in a deployed state, according to one embodiment of the present disclosure.
Figure 7:
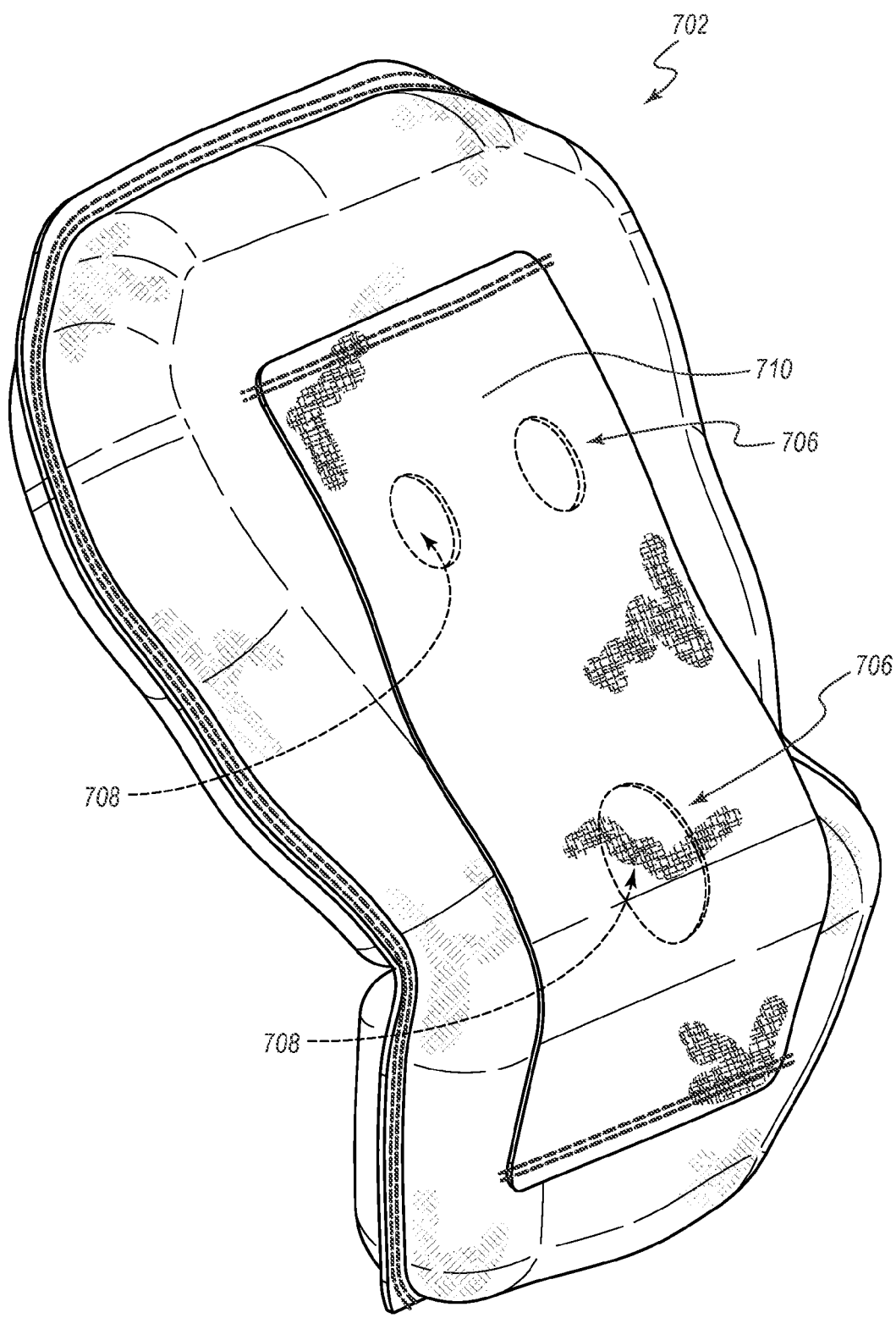
FIG. 7 is a rear perspective view of an inflatable knee airbag with variable size adaptive vents with a wide strap in a deployed state, according to one embodiment of the present disclosure.
Figure 8:
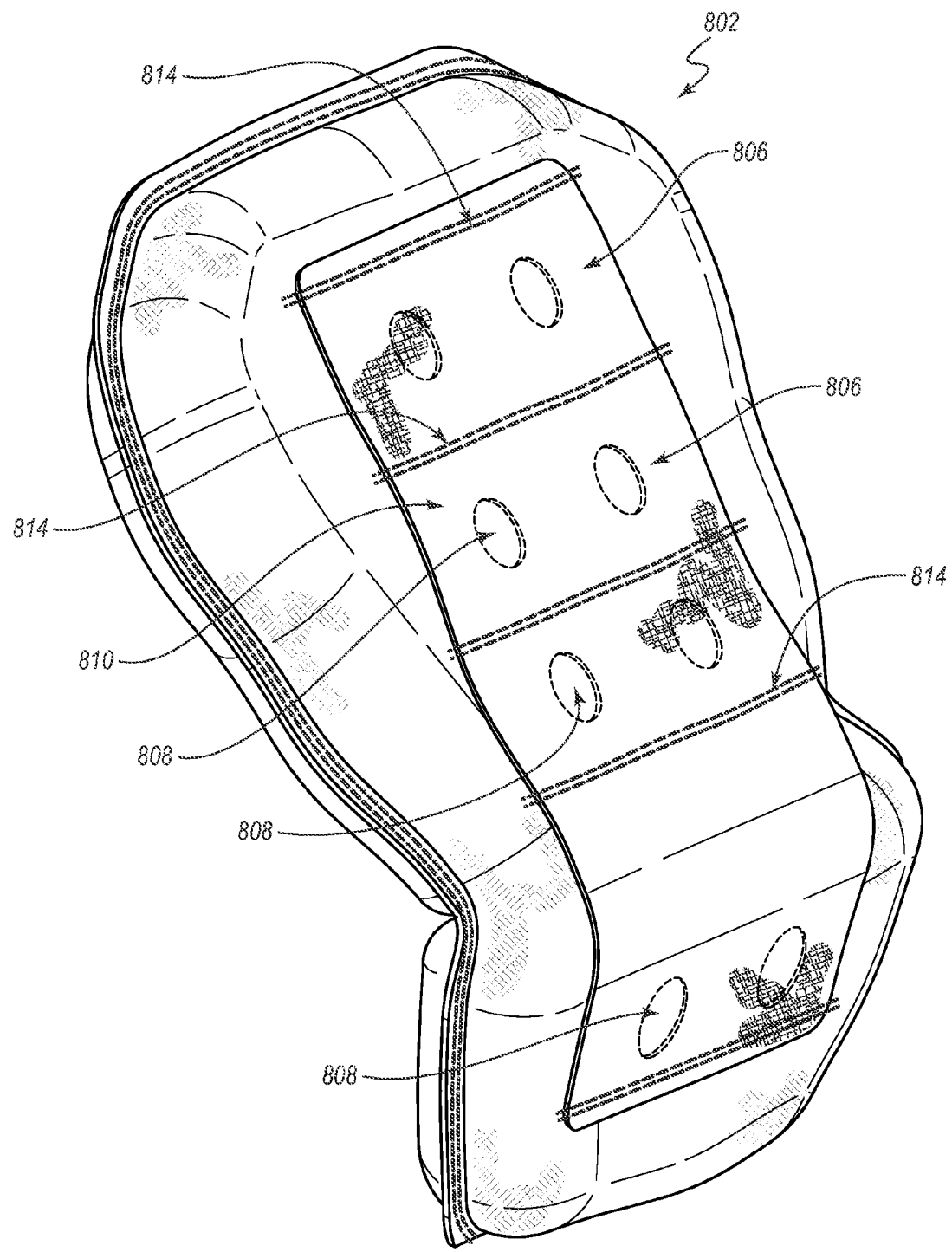
FIG. 8 is a rear perspective view of an alternate embodiment of an inflatable knee airbag with adaptive vents with a wide strap in a deployed state according to one embodiment of the present disclosure.

FIGS. 3-10B show alternative embodiments of adaptive vent airbags that include placement and structure of adaptive vents. Alternate placements and structures of adaptive vents can be used to adjust for occupant size and/or occupant position or location. FIGS. 3 and 4 show construction of an adaptive vent airbag with two adaptive vents at a lower position. FIG. 5 shows construction of an adaptive vent with strap apertures. FIGS. 6-8 show construction of wide strap adaptive vents with multiple cushion apertures and placement. FIGS. 9A-10B show construction of a wrap-around wide strap adaptive vent with multiple apertures.

FIG. 3 is a rear perspective view of an adaptive venting inflatable knee airbag 302 with multi-strap adaptive vents 306 in a deployed state, according to one embodiment of the present disclosure. The adaptive venting KAB 302 includes a cushion 304 which vents gas through one or more adaptive vents 306 in an initial phase of deployment when an obstruction (e.g., an OOP occupant) is encountered. If unobstructed, the cushion deploys normally, and the adaptive vents 306 close to contain the gas within the cushion 304. The adaptive vents 306 are disposed on or in a surface of the cushion 304 that is configured to face toward, or is otherwise nearer to, an occupant. In the illustrated embodiment of FIG. 3, the adaptive vents 306 are disposed on surface configured to face toward the feet or lower leg of an occupant.

FIG. 4 is an exploded rear perspective view of the inflatable knee airbag of FIG. 3. Straps 310 can be attached by stitching 314, such as at the lower end of the KAB 302 or near the adaptive vents 306 (at one end) and the opposite end may be attached by stitching 314 on the occupant side of the cushion 304 in an area around or above the knee contact area.

Figure 11A:
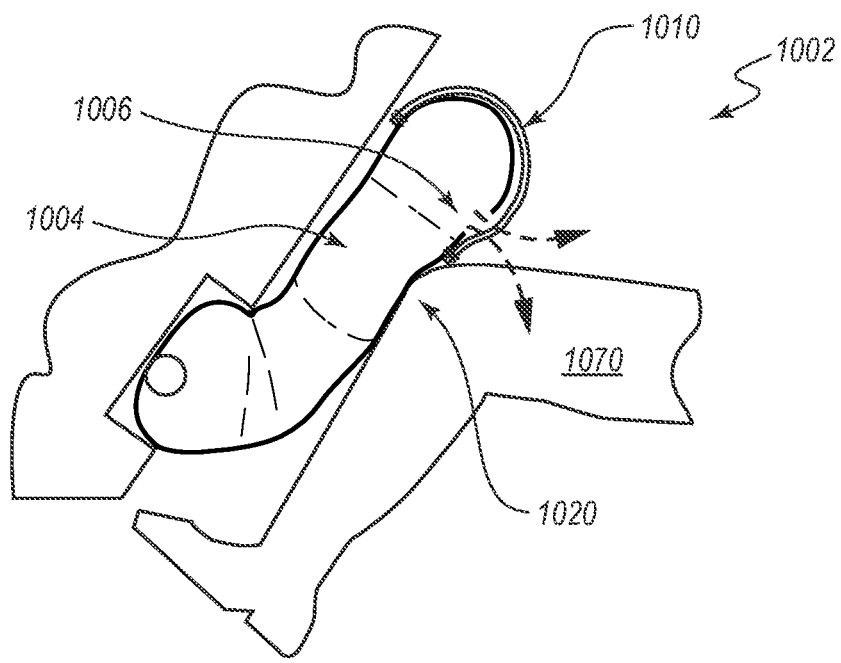
FIG. 11A is a side elevation view of an inflatable knee airbag with adaptive vents with a back-side tacked topside wide strap in a deployed state with an occupant knee contact location typical of a smaller or short-statured in-position occupant, according to one embodiment of the present disclosure.
Figure 11B:
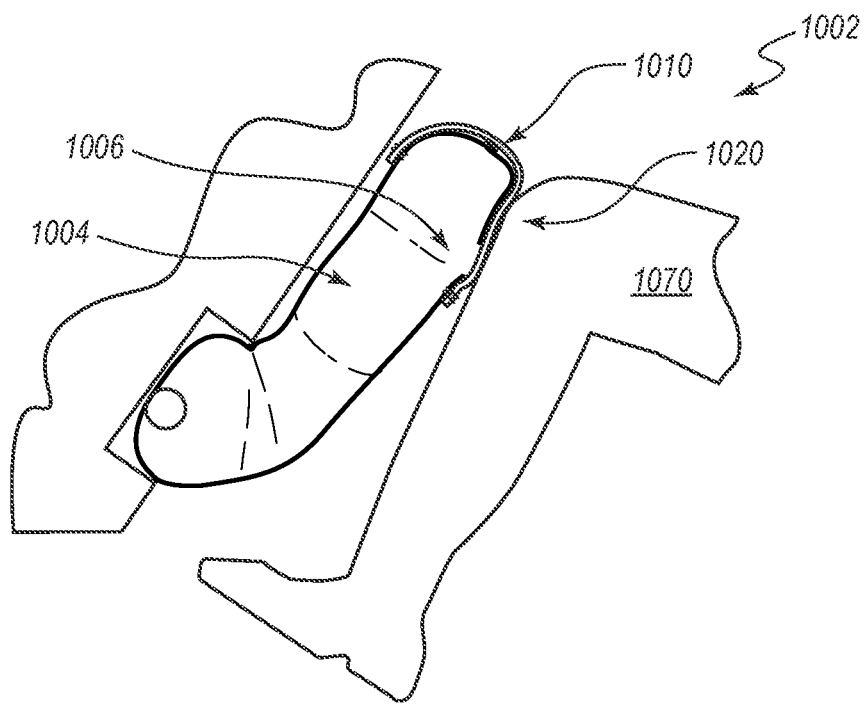
FIG. 11B is a side elevation view of an inflatable knee airbag with adaptive vents with a back-side tacked topside wide strap in a deployed state with an occupant knee contact location typical of a larger or taller in-position occupant, according to one embodiment of the present disclosure.

Attachment locations (e.g., stitching 314, etc.), strap shape, strap orientation, vent holes 308 and strap apertures (see FIG. 5) can be varied to optimize performance for different occupant sizes (see, e.g., FIGS. 11A and 11B for an example and description). Straps 310 can be routed through guides 312 (such as loops 312) secured on the cushion surface to guide and retain the straps 310 as they are pulled in tension through stitching 314 to the cushion 304. Straps 310 may be rectangular or tapered, attached on an angle, or vertically oriented to align with various occupant knee/leg contact locations.

Attachment locations can be formed by various types of couplings between straps 310 and cushion 304, including stitching 314, adhesive, material fusion, etc. It should be recognized that while stitching is shown for consistency and ease of understanding, other couplings (including those listed above) can be substituted for stitching in each of the figures.

In the embodiment shown in FIG. 4, a vent strap 310 covers a vent hole 308 when inflated and unobstructed, such as by a knee of an occupant seated in an occupant position. Each vent hole 308 is disposed in a surface of the cushion 304 configured to face an occupant, and each vent strap is similarly disposed on one or more surfaces of the cushion 304 configured to face the occupant. As the cushion expands, the vent strap 310 is held taut against the vent hole 308, preventing an escape of inflation gas. However, the vent strap 310 is not drawn taut and therefore does not fully cover the vent hole 308 when inflation of the cushion 304 is obstructed, such as by a knee of an OOP occupant. As a result of the obstruction, the vent strap 310 is no longer held taut, but includes slack that allows the inflation gas to push the strap away from the vent hole 308. The vent hole 308 allows inflation gas to escape in a gap formed between the vent strap 310 and vent hole 308.

FIG. 5 is a rear perspective view of an inflatable knee airbag 502 with adaptive vents 506 and strap venting holes 516, in a deployed state, according to one embodiment of the present disclosure. Vent straps 510 are shown in tension due to unobstructed deployment. In a scenario of unobstructed deployment of the inflatable knee airbag 502, the vent strap 510 pulls taut and also draws the strap venting holes 516 out of alignment with a cushion vent hole 508. One or more loops 512 guides and retain the vent straps 510 in position over the cushion vent hole 508. During an obstructed deployment, the vent straps 510 will include slack, which can cause the strap venting holes 516 to at least partially align with cushion vent holes 508. The degree of alignment of the strap venting hole 516 with the cushion vent hole 508 can influence an amount of inflation gas that escapes the airbag cushion 504. Stated otherwise, alignment of a strap venting hole 516 with a cushion vent hole 508 increases venting capacity of the inflatable knee airbag 502.

In another embodiment, multiple strap vents can be used. For example, strap vents can become progressively smaller as the strap vent is brought closer to a cushion vent. An amount of venting (or selection of a vent) can be based on a range of OOP occupant positions. As the vent strap gains more slack, a progressively larger strap venting hole aligns with the cushion vent hole. With multiple strap venting holes, the less an OOP occupant position obstructs the airbag cushion during deployment, the more displacement the airbag can achieve. When smaller vents are selected, a higher pressure occurs.

FIG. 6 is a rear perspective view of an inflatable knee airbag 602 with adaptive vents 606 with a wide strap (or panel) 610 in a deployed state according to one embodiment of the present disclosure. Strap 610 width and cushion venting hole 608 characteristics (such as diameter) can be modified, depending on a desired application to an occupant position.

FIG. 7 is a rear perspective view of an inflatable knee airbag 702 with variable size adaptive vents 706 with a wide strap 710 in a deployed state, according to one embodiment. A single wide strap 710 (also known as a tether or panel) can be used instead of separate narrow straps of earlier described embodiments. One or more cushion venting holes 708 can be covered by the wide strap 710. The wide strap 710 can be sewn to the cushion. The venting holes 708 and the strap 710 are disposed in one or more surfaces of a cushion of the airbag 702 that are configured to face toward the occupant. Alternatively, attachment of the wide strap 710 can be integrated into existing cushion stitching.

In one embodiment, a wide strap includes multiple strap vents of various sizes. The benefit of this embodiment is in cases of a greater amount of obstruction, more venting occurs. This is accomplished by locating larger strap vents toward the top of the strap, with progressively smaller vents closer to the cushion vents.

FIG. 8 is a rear perspective view of an alternate embodiment of an inflatable knee airbag 802 with adaptive vents 806 with a wide strap 810 in a deployed state, according to one embodiment. A strap 810 or panel can include multiple attachments 814 to the inflatable knee airbag 802. In the embodiment shown, a strap 810 includes multiple seams (as part of attachments 814) between pairs of cushion vent holes 808.

Figure 9A:
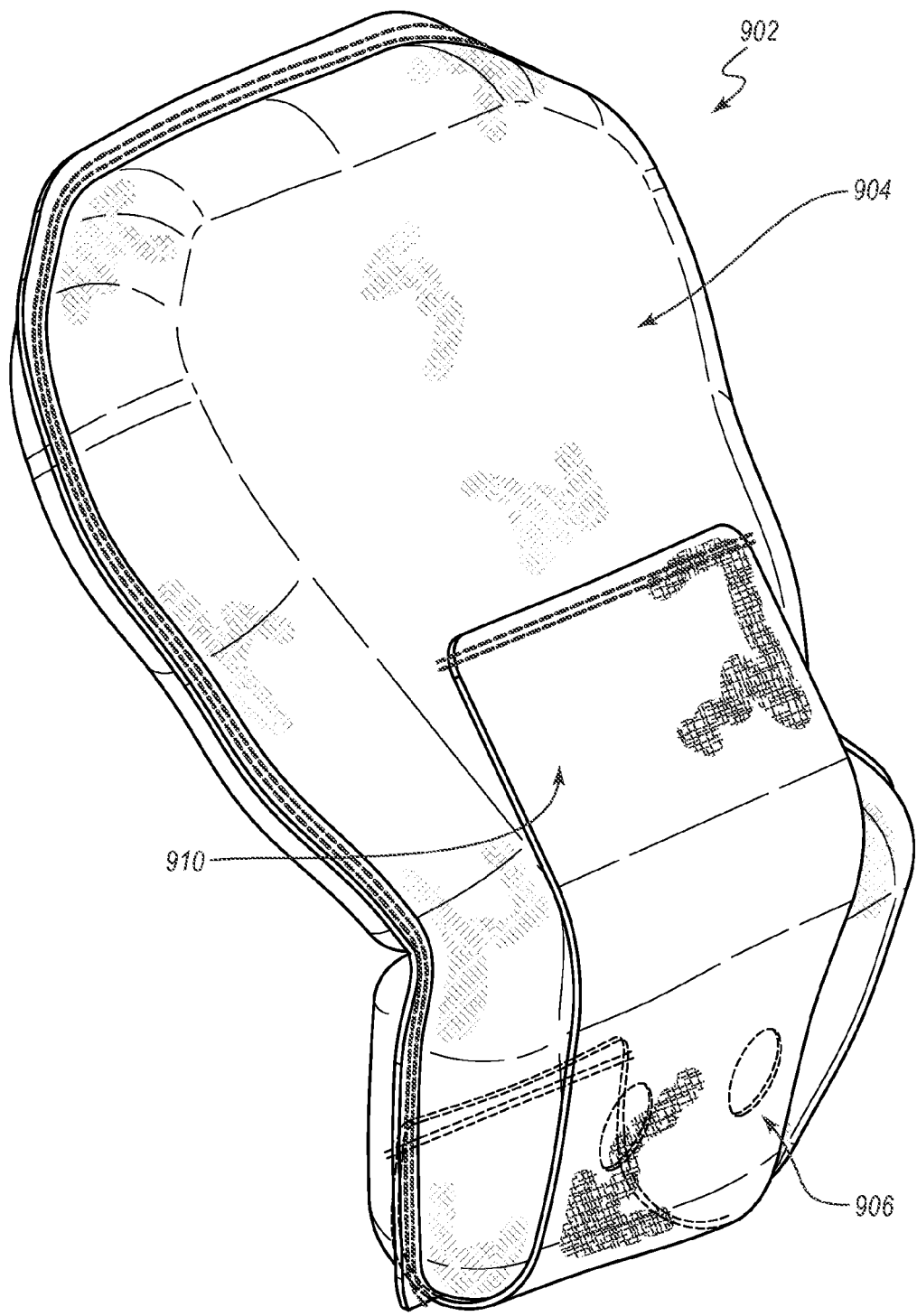
FIG. 9A is a rear perspective view of an inflatable knee airbag with adaptive vents with a back-side tacked underside wide strap in a deployed state according to one embodiment of the present disclosure.
Figure 9B:
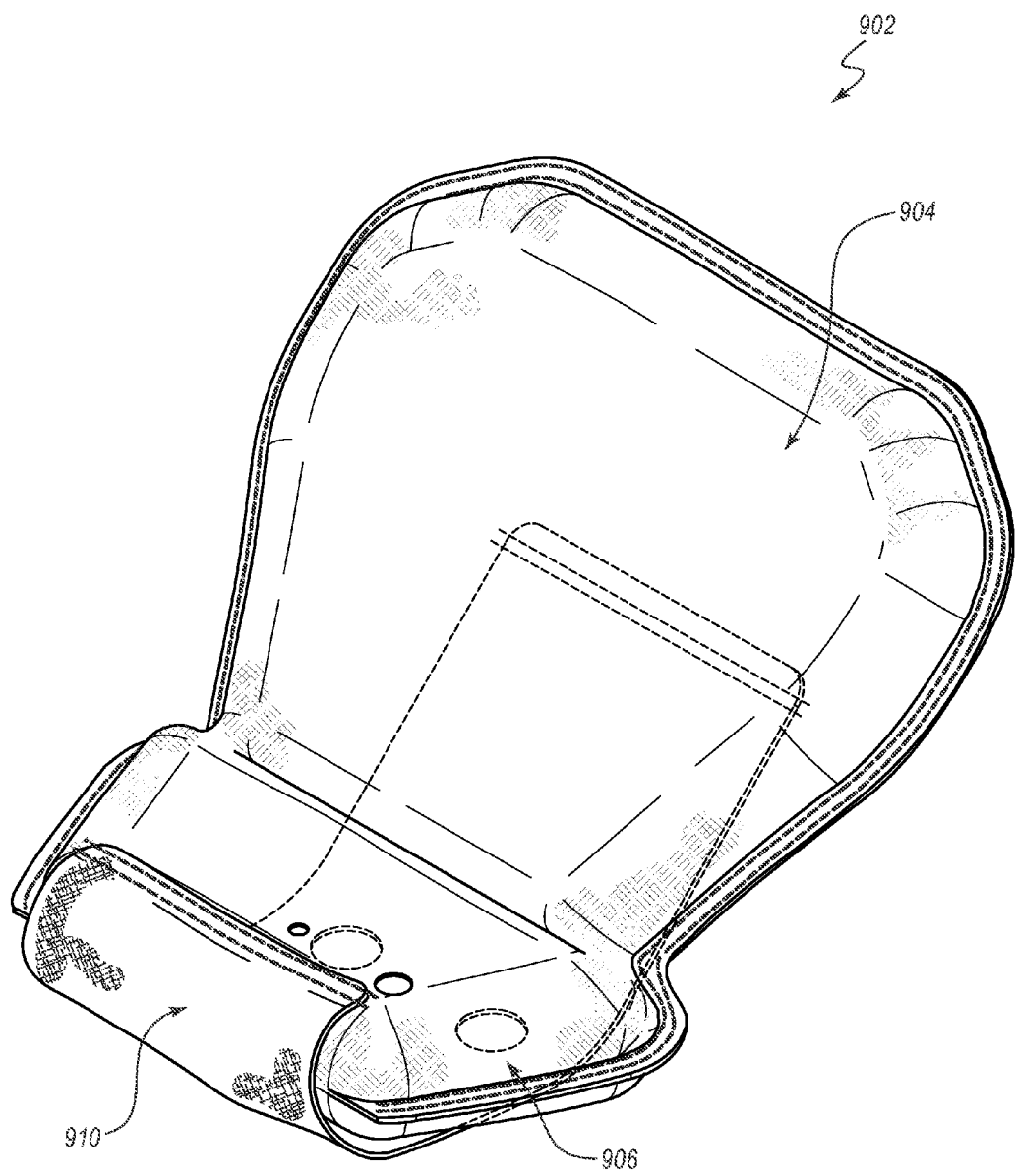
FIG. 9B is a front perspective view of an inflatable knee airbag with adaptive vents with a back-side tacked underside wide strap in a deployed state, according to one embodiment of the present disclosure.

Straps can be attached at different locations on the cushion and can extend over a top (or bottom) edge of cushion. FIG. 9A is a rear perspective view of an inflatable knee airbag 902 with adaptive vents 906 with an underside wrap-around wide strap 910 in a deployed state, according to one embodiment. FIG. 9B is a front perspective view of an inflatable knee airbag 902 with adaptive vents 906 with an underside wrap-around wide strap 910 in a deployed state according to one embodiment. In the embodiments shown, the underside wrap-around wide strap 910 is attached to the back side and front side of the airbag cushion 904. By locating the strap 910 differently along the inflatable knee airbag 902, adjustments can be made for various occupant knee/leg positions. For example, the strap of FIGS. 9A and 9B may engage with a knee of a short-statured occupant when the knee contact area is lower than a knee contact area of a taller occupant. A knee of a taller in-position occupant may normally engage with the cushion 904.

Figure 10A:
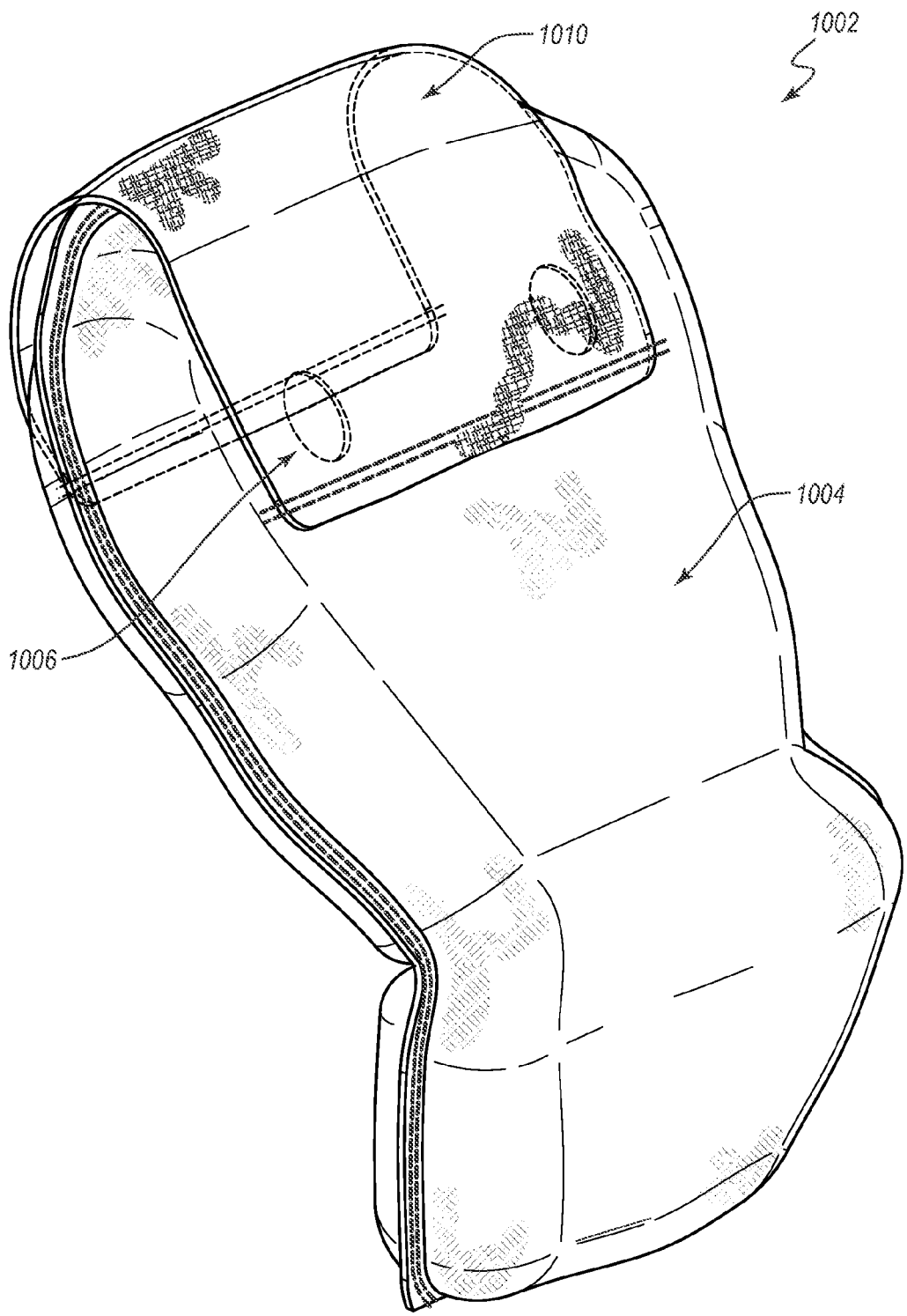
FIG. 10A is a rear perspective view of an inflatable knee airbag with adaptive vents with a back-side tacked topside wide strap in a deployed state, according to one embodiment of the present disclosure.

FIGS. 10A-11B show a structure and operation of an inflatable knee airbag 1002 with a topside wrap-around wide strap 1010. FIGS. 11A-11B contrast operation of the inflatable knee airbag of FIGS. 10A-10B according to interaction of a lower knee contact area of an occupant (FIG. 11A) and a higher knee contact area of an occupant (FIG. 11B). FIG. 10A is a rear perspective view of an inflatable knee airbag with adaptive vents 1006 disposed on a surface of the cushion 1004 to face an occupant and with a topside wrap-around wide strap 1010 in a deployed state. The strap 1010 is coupled to the a surface of the cushion 1004 to face an occupant and wraps over a top of the cushion to couple to a different surface of the cushion that is configured to face away from an occupant. FIG. 10B is a front perspective view of FIG. 10A. The wide strap 1010 is shown extending over a top of the cushion 1004.

Figure 10B:
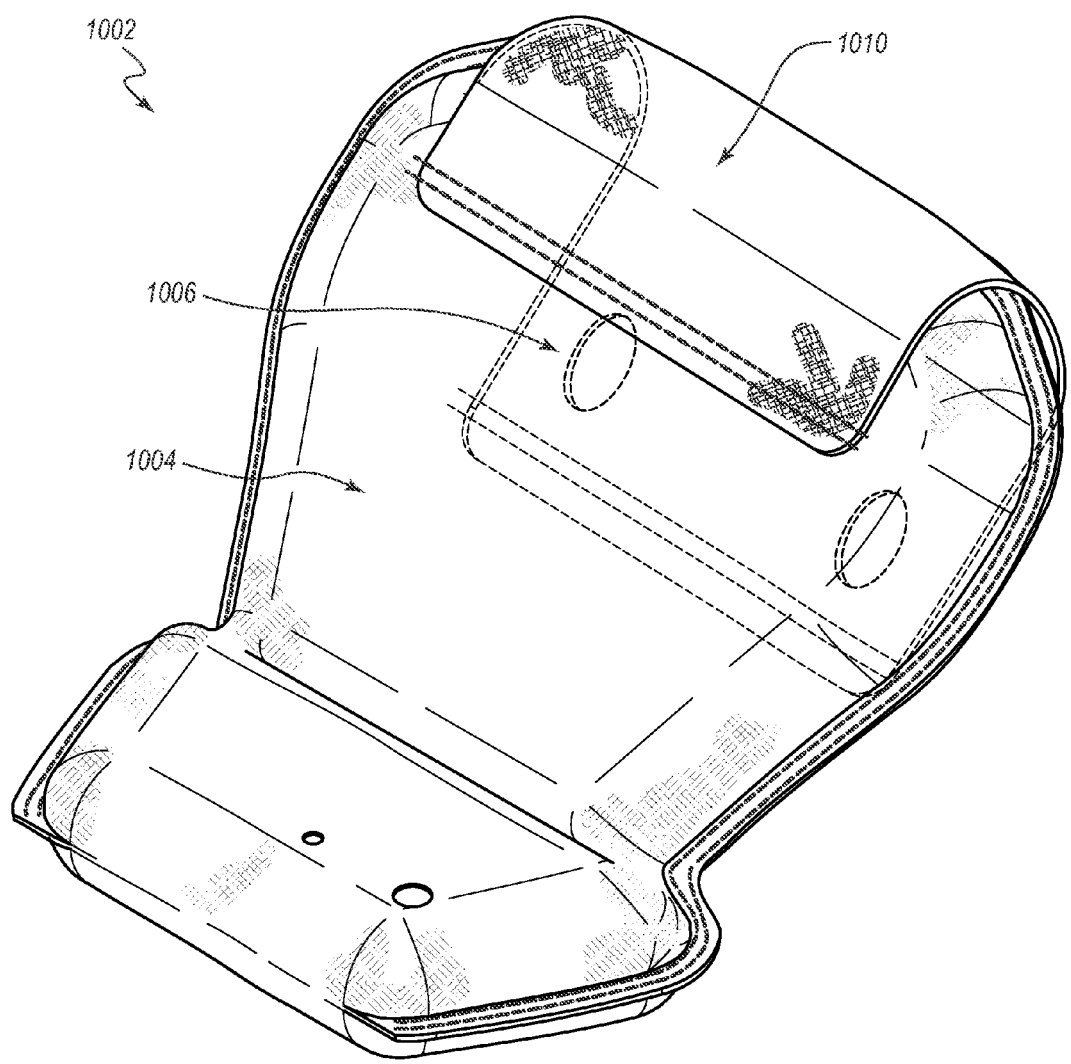
FIG. 10B is a front perspective view of an inflatable knee airbag with adaptive vents with a back-side tacked topside wide strap in a deployed state, according to one embodiment of the present disclosure.

FIG. 11A is a side elevation view of an inflatable knee airbag 1002 of FIGS. 10A and 10B with adaptive vents 1006 and a topside wrap-around wide strap 1010 in a deployed state. A short-statured occupant is seated in the occupant position 1070. The occupant may have a lower knee position compared to a taller occupant. In the embodiment, a knee contact region 1020 for a short-statured occupant in the occupant position 1070 is on the inflatable knee airbag cushion 1004 itself. For the short-statured occupant, the contact region 1020 is lower and will not draw the strap 1010 taut to keep a tight seal against vents 1006. This allows leakage through the adaptive vents 1006 and provides a lower pressure for a smaller, short-statured occupant.

FIG. 11B is a side elevation view of the inflatable knee airbag 1002 of FIG. 11A with a taller occupant with a higher knee position seated in the occupant position 1070. The strap 1010 extends down to knee contact zone 1020 of the taller occupant disposed in the occupant position 1070. When the cushion 1004 is inflated and the wide strap 1010 is pulled taut, the occupant knees contacting the upper region can maintain the adaptive vents 1006 sealed, enabling higher pressure. In the embodiment shown, the knee contact region 1020 for a taller occupant knee position is on the wide strap 1010.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified.

Moreover, sub-routines or only a portion of a method described herein may be a separate method within the scope of this disclosure. Stated otherwise, some methods may include only a portion of the steps described in a more detailed method.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated by one of skill in the art with the benefit of this disclosure that in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. It will be apparent to those having skill in the art that changes may be made to the details of the above-described embodiments without departing from the underlying principles of the present disclosure.

The invention claimed is:

1. An inflatable knee airbag configured to be positioned in a vehicle forward of an occupant position and at a bottom portion of one of an instrument panel and a seat back, wherein the inflatable knee airbag comprises:
   a plurality of panels defining an inflatable chamber, at least one panel comprising a vent, the inflatable chamber to receive inflation gas provided by an inflator;
   a strap external to the chamber and coupled to the inflatable chamber, the strap configured to:
      obstruct the vent when there is an obstructed deployment of the inflatable knee airbag causing a pressure pushing the strap against the vent; and
      at least partially uncover the vent when there is an unobstructed deployment of the inflatable knee airbag causing a lack of pressure of the strap against the vent.

2. The inflatable knee airbag of claim 1, wherein the pressure of the strap being pushed against the vent is to be caused by a large or tall occupant.

3. The inflatable knee airbag of claim 1, wherein the lack of pressure of the strap against the vent results from lack of contact with a small or short-statured occupant.

4. The inflatable knee airbag of claim 1, wherein the strap extends over a top portion of the inflatable chamber.

5. The inflatable knee airbag of claim 4, wherein a first end of the strap is attached to a front of the inflatable chamber and a second end of the strap is attached to a back of the inflatable chamber.

6. The inflatable knee airbag of claim 1, wherein the strap is a panel.

7. The inflatable knee airbag of claim 6, wherein the strap is configured to cover a plurality of vents.

\* \* \* \* \*